US006939224B2

(12) United States Patent
Palmer et al.

(10) Patent No.: US 6,939,224 B2
(45) Date of Patent: Sep. 6, 2005

(54) GAMING DEVICE HAVING VARYING RISK PLAYER SELECTIONS

(75) Inventors: Gregg J. Palmer, Reno, NV (US); Lance R. Peterson, Reno, NV (US); Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 299 days.

(21) Appl. No.: 10/097,692

(22) Filed: Mar. 12, 2002

(65) Prior Publication Data

US 2003/0176215 A1 Sep. 18, 2003

(51) Int. Cl.[7] .................................................. A63F 13/00

(52) U.S. Cl. ................................ 463/16; 463/6; 463/25

(58) Field of Search ............................ 463/1, 6, 16–21, 463/25, 28, 40–42, 58–60, 65, 68; 273/358, 366, 368, 246, 277, 138.1, 139, 141 R, 142 R, 138.2, 298, 148 B, 459–460

(56) References Cited

U.S. PATENT DOCUMENTS 3,645,531 A * 2/1972 Wright ........................ 463/17
4,373,723 A * 2/1983 Brown et al. .................. 463/6
4,527,798 A * 7/1985 Siekierski et al. ............ 463/17
4,624,459 A 11/1986 Kaufman
4,669,731 A 6/1987 Clarke
4,695,053 A 9/1987 Vazquez, Jr. et al.
4,743,022 A 5/1988 Wood
4,756,531 A 7/1988 DiRe
4,836,546 A 6/1989 DiRe
4,991,848 A 2/1991 Greenwood et al.
5,102,137 A 4/1992 Ekiert
5,456,465 A 10/1995 Durham
5,501,455 A 3/1996 Hirata et al.
5,524,888 A 6/1996 Heidel (Continued)

FOREIGN PATENT DOCUMENTS

WO WO 97/32285 9/1997

OTHER PUBLICATIONS

Scarne, John, Scarne's New Complete Guide to Gambling, 1986, Simon & Schuster, Inc., First Fireside Edition, pp. 32–108.*

(Continued)

*Primary Examiner*—Scott E. Jones
(74) *Attorney, Agent, or Firm*—Bell Boyd & Lloyd LLC

(57) ABSTRACT

The present invention provides a processor controlled gaming device having a display device in communication with the processor. When the display device receives an input from the player, gaming device 10 randomly generates an outcome, the display device displays an event having the outcome and gaming device 10 provides the player with a payout in association with the outcome and the selected input. The inputs have paytables that vary in range. One input has a large, risky payout range with big and small payouts. One input has a small, conservative payout range with intermediate payouts. Other inputs have ranges that fall in between the risky and conservative ranges. Each of the ranges has the same overall expected value, so that gaming device 10 does not favor the player's choice of a risky or conservative input.

50 Claims, 11 Drawing Sheets

U.S. PATENT DOCUMENTS

| | | | | | |
|---|---|---|---|---|---|
| 5,542,669 | A | | 8/1996 | Charron et al. | |
| 5,560,603 | A | | 10/1996 | Seelig et al. | |
| 5,569,084 | A | | 10/1996 | Nicastro et al. | |
| 5,580,053 | A | | 12/1996 | Crouch | |
| 5,611,535 | A | | 3/1997 | Tiberio | |
| 5,664,998 | A | | 9/1997 | Seelig et al. | |
| 5,711,525 | A | | 1/1998 | Breeding | |
| 5,779,544 | A | | 7/1998 | Seelig et al. | |
| 5,788,573 | A | | 8/1998 | Baerlocher et al. | |
| 5,795,226 | A | * | 8/1998 | Yi | 463/22 |
| 5,823,872 | A | | 10/1998 | Prather et al. | |
| 5,830,068 | A | * | 11/1998 | Brenner et al. | 463/42 |
| 5,833,536 | A | | 11/1998 | Davids et al. | |
| 5,873,781 | A | | 2/1999 | Keane | |
| 5,888,136 | A | * | 3/1999 | Herbert | 463/22 |
| 5,910,046 | A | | 6/1999 | Wada et al. | |
| 5,957,775 | A | * | 9/1999 | Cherry | 463/16 |
| 5,967,894 | A | | 10/1999 | Kinoshita et al. | |
| 5,976,015 | A | | 11/1999 | Seelig et al. | |
| 5,997,400 | A | | 12/1999 | Seelig et al. | |
| 6,004,207 | A | | 12/1999 | Wilson, Jr. et al. | |
| 6,015,346 | A | | 1/2000 | Bennett | |
| 6,019,369 | A | | 2/2000 | Nakagawa et al. | |
| 6,056,642 | A | | 5/2000 | Bennett | |
| 6,102,798 | A | | 8/2000 | Bennett | |
| 6,117,008 | A | | 9/2000 | Machiguchi | |
| 6,126,542 | A | | 10/2000 | Fier | |
| 6,155,925 | A | | 12/2000 | Giobbi et al. | |
| 6,159,096 | A | | 12/2000 | Yoseloff | |
| 6,159,097 | A | | 12/2000 | Gura | |
| 6,159,098 | A | | 12/2000 | Slomiany et al. | |
| 6,174,233 | B1 | | 1/2001 | Sunaga et al. | |
| 6,174,235 | B1 | | 1/2001 | Walker et al. | |
| 6,186,894 | B1 | | 2/2001 | Mayeroff | |
| 6,190,255 | B1 | | 2/2001 | Thomas et al. | |
| 6,203,429 | B1 | | 3/2001 | Demar et al. | |
| 6,213,876 | B1 | | 4/2001 | Moore, Jr. | |
| 6,224,482 | B1 | | 5/2001 | Bennett | |
| 6,224,483 | B1 | | 5/2001 | Mayeroff | |
| 6,231,442 | B1 | | 5/2001 | Mayeroff | |
| 6,231,445 | B1 | | 5/2001 | Acres | |
| 6,234,897 | B1 | | 5/2001 | Frohm et al. | |
| 6,261,177 | B1 | | 7/2001 | Bennett | |
| 6,309,300 | B1 | | 10/2001 | Glavich | |
| 6,315,664 | B1 | | 11/2001 | Baerlocher et al. | |
| 6,346,043 | B1 | | 2/2002 | Colin et al. | |
| 6,347,996 | B1 | | 2/2002 | Gilmore et al. | |
| 6,358,150 | B1 | * | 3/2002 | Mir et al. | 463/28 |
| 6,386,974 | B1 | | 5/2002 | Adams | |
| 6,398,644 | B1 | | 6/2002 | Perrie et al. | |
| 6,406,369 | B1 | | 6/2002 | Baerlocher et al. | |
| 6,413,160 | B1 | | 7/2002 | Vancura | |
| 6,443,837 | B1 | | 9/2002 | Jaffe et al. | |
| 6,482,089 | B2 | | 11/2002 | DeMar et al. | |
| 6,572,473 | B1 | | 6/2003 | Baerlocher | |
| 6,609,972 | B2 | | 8/2003 | Seelig et al. | |
| 2001/0014619 | A1 | * | 8/2001 | Kusuda | 463/6 |
| 2002/0058548 | A1 | * | 5/2002 | Stronach | 463/25 |
| 2003/0087683 | A1 | * | 5/2003 | Gatto et al. | 463/6 |

OTHER PUBLICATIONS

Bonus Spin Red, White & Blue Advertisement written by International Game Technology, published in 2000.

Five Times Pay Bonus Spin Advertisement written by International Game Technology, published in 1999.

Polly & Rodger Advertisement written by VLC, published prior to 2002.

Road Rally Advertisement written by A. C. Coin, published prior to 2002.

Top Dollar Advertisement written by IGT, published in 1998.

Top Gear Advertisement written by Aristocrat, published in 1995.

Vision Series Advertisement written by IGT, published prior to 2002.

Slot Machines Article, written by Marshall Fey, published in 1989.

* cited by examiner 40, 110b, 102a, 102b, 106a–106d, 112

| | PAYOUTS | |
|---|---|---|
| | BLACK | WHITE |
| A | 5 | 70 |
| B | 30 | 45 |
| C | 75 | 40 |
| D | 100 | 20 |

40, 120b, 102a, 102b, 106a–106d, 122

| | PROBABILITY | |
|---|---|---|
| | BLACK | WHITE |
| A | 40% | 10% |
| B | 30% | 20% |
| C | 20% | 30% |
| D | 10% | 40% |

130b, 102a, 102b, 106a–106d, 132, 134

| | EXPECTED VALUE | |
|---|---|---|
| | BLACK | WHITE |
| A | 2 | 7 |
| B | 9 | 9 |
| C | 15 | 12 |
| D | 10 | 8 |
| EXPECTED VALUE | 36 | 36 |

PAYOUTS

| | BLACK | GRAY | WHITE |
|---|---|---|---|
| A | 5 | 66 | 35 |
| B | 100 | 10 | 15 |

PROBABILITY

| | BLACK | GRAY | WHITE |
|---|---|---|---|
| A | 80% | 25% | 45% |
| B | 20% | 75% | 55% |

EXPECTED VALUE

| | BLACK | GRAY | WHITE |
|---|---|---|---|
| A | 4 | 16.5 | 15.75 |
| B | 20 | 7.5 | 8.25 |
| EXPECTED VALUE | 24 | 24 | 24 |

FIG.6B

PAYOUTS

| | BLACK | GRAY | WHITE |
|---|---|---|---|
| WIN | 32 | 80 | 100 |
| PLACE | 40 | 25 | 50 |
| SHOW | 60 | 20 | 10 |

FIG.6C

PROBABILITIES

| | BLACK | GRAY | WHITE |
|---|---|---|---|
| WIN | 50% | 30% | 20% |
| PLACE | 30% | 40% | 30% |
| SHOW | 20% | 30% | 50% |

FIG.6D

EXPECTED VALUE

| | BLACK | GRAY | WHITE |
|---|---|---|---|
| WIN | 16 | 24 | 20 |
| PLACE | 12 | 10 | 15 |
| SHOW | 12 | 6 | 5 |
| EXPECTED VALUE | 40 | 40 | 40 |

FIG.8

40

180a Pick Both Win and Place 1 (120i, 110i, 130i; 122, 112, 132)

| | Win | Plc | Prob | Pay | Contrib |
|---|---|---|---|---|---|
| 182a | 1 | 2 | 32.14% | 155 | 49.82 |
| 182b | 1 | 3 | 25.86% | 195 | 50.42 |
| 182c | 1 | 4 | 12.48% | 400 | 49.92 |
| 182d | 2 | 3 | 16.93% | 300 | 50.79 |
| 182e | 2 | 4 | 7.12% | 700 | 49.85 |
| 182f | 3 | 4 | 5.47% | 900 | 49.24 |
| | | | Average Contribution | | 50.01 (184a) |

180b Pick Both Win and Place 2 (120j, 110j, 130j; 122, 112, 132)

| | Win | Plc | Prob | Pay | Contrib |
|---|---|---|---|---|---|
| 182a | 1 | 2 | 43.89% | 114 | 50.03 |
| 182b | 1 | 3 | 25.56% | 195 | 49.83 |
| 182c | 1 | 4 | 9.81% | 508 | 49.86 |
| 182d | 2 | 3 | 13.67% | 365 | 49.88 |
| 182e | 2 | 4 | 4.81% | 1035 | 49.83 |
| 182f | 3 | 4 | 2.26% | 2240 | 50.61 |
| | | | Average Contribution | | 50.01 (184b) |

180c Pick Both Win and Place 3 (120k, 110k, 130k; 122, 112, 132)

| | Win | Plc | Prob | Pay | Contrib |
|---|---|---|---|---|---|
| 182a | 1 | 2 | 35.38% | 141 | 49.89 |
| 182b | 1 | 3 | 27.86% | 180 | 50.14 |
| 182c | 1 | 4 | 3.38% | 1475 | 49.91 |
| 182d | 2 | 3 | 27.88% | 180 | 50.19 |
| 182e | 2 | 4 | 3.18% | 1575 | 50.06 |
| 182f | 3 | 4 | 2.31% | 2160 | 49.94 |
| | | | Average Contribution | | 50.02 (184c) |

180d Pick Both Win and Place 4 (1201, 1101, 1301; 122, 112, 132)

| | Win | Plc | Prob | Pay | Contrib |
|---|---|---|---|---|---|
| 182a | 1 | 2 | 40.38% | 125 | 50.48 |
| 182b | 1 | 3 | 21.86% | 225 | 49.18 |
| 182c | 1 | 4 | 9.37% | 535 | 50.10 |
| 182d | 2 | 3 | 17.49% | 285 | 49.84 |
| 182e | 2 | 4 | 7.72% | 650 | 50.19 |
| 182f | 3 | 4 | 3.19% | 1575 | 50.17 |
| | | | Average Contribution | | 49.99 (184d) |

GAMING DEVICE HAVING VARYING RISK PLAYER SELECTIONS

CROSS REFERENCE TO RELATED APPLICATIONS

The present invention relates to the following co-pending commonly owned U.S. patent applications: "Gaming Device Having A Bonus Round With Multiple Random Award Generation And Multiple Return/Risk Scenarios," filed Oct. 4, 2000, Ser. No. 09/678,989, "Gaming Device Having Graduating Award Exchange Sequence With A Tease Consolation Sequence And An Initial Qualifying Sequence," filed Oct. 6, 2000, Ser. No. 09/680,601"Gaming Device Having Risk Evaluation Bonus Round," filed Oct. 16, 2000, Ser. No. 09/688,434"Gaming Device Having An Improved Offer/Acceptance Bonus Scheme," filed Sep. 28, 2001, Ser. No. 09/966,884"Gaming Device Including Choices Having Varying Probabilities of Contributing to Game's Termination," filed Sep. 20, 2001, Ser. No. 09/957,308"Gaming Device Having Offer Acceptance Game With Termination Limit," filed Mar. 30, 2001, Ser. No. 09/822,711 and "Gaming Device Having Offer/Acceptance Advance Threshold And Limit Bonus Scheme," filed Apr. 19, 2001, Ser. No. 09/838,014

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with player selectable items that provide a return based on the probability of varying outcomes.

BACKGROUND OF THE INVENTION

Gaming devices currently exist with games having the single goal or objective of achieving the highest award possible. For example, U.S. Pat. No. 6,190,255 B1, which issued on Feb. 20, 2001, and which is assigned on its face to WMS Gaming Inc., discloses a bonus round in which a player has one or more opportunities to choose masked bonus awards from a group of masked awards displayed to the player. When the player chooses a masked award from the group, the game removes the mask and either awards the player with a bonus value or terminates the bonus round with a bonus terminator. The outcome depends upon whether the player selects an award or a terminator.

In this game, the controller of the gaming device randomly places a predetermined number of masked awards and terminators in the group at the beginning of the bonus round and maintains the positioning until the bonus round terminates. When the player selects a masked award, the player receives the value of the award. The player then selects another masked award, and the process continues until the player selects a masked terminator. The goal in this game is to not pick a terminator for as long as possible and accumulate as many credits as possible. There is no risk involved with making subsequent picks and no reason for the player to stop picking before picking a masked terminator.

PCT application PCT/AU97/00121 entitled, Slot Machine Game with Roaming Wild Card, having a publication date of Sep. 4, 1997, discloses another example. In this game, a slot machine having a video display contains a plurality of rotatable reels with game symbols. When the player receives a triggering symbol or combination, the game produces a bonus symbol. The bonus symbol moves from game symbol to game symbol temporarily changing the game symbol to a bonus symbol. If the change results in a winning combination, the player receives an award. This game provides no risk for advancement of the symbol.

Other types of games have the goal of achieving the highest award possible and also include an element of risk in the player's decision. For example, a well known offer/acceptance game provides a player with a series of offers, where each offer includes a number of credits, coins, tokens or dollars. The player may accept or reject each offer prior to the final offer. The offers are randomly determined from a series of potential offers of differing values, which are displayed to the player. The player therefore knows whether the current offer is a "good" offer. If the current offer is a good offer, but not the best offer, the player must decide whether to risk the good offer for a chance of obtaining the best offer.

The element of risk provided by offer/acceptance games has made them very popular in the gaming industry. Moreover, varying award returns with risk increases player anticipation, excitement and enjoyment. Some players enjoy risking obtained awards for higher awards especially in bonus games where the awards are in addition to base game awards. Some players take more risks employing different strategies than they use in the normal base games. Other players enjoy playing it safe and playing for the largest highly probable award. It is therefore desirable to have a gaming device with a primary or bonus game that enables the player to play for more valuable and more risky awards or to play for less valuable but more likely awards.

SUMMARY OF THE INVENTION

The present invention provides a base game or a bonus game of a gaming device having varying risk selections or player inputs. More specifically, one embodiment of the present invention includes a plurality of inputs have varying payout ranges. The game enables the player to select one of the inputs. One input has a large, risky payout range including a relatively large or valuable payout and a relatively small payout. One input has a smaller more conservative payout range which includes two intermediate payouts. Other inputs have ranges that fall between the risky and conservative ranges may also be included in the game of the present invention. The game informs the player as to which input is "risky" and which input is "safe." Each of the payout ranges in combination with their associated probability ranges has the same overall expected value. In this manner, the game does not favor the player's choice of a risky or conservative input. The processor of the gaming device generates an outcome based on the player's input and the game provides the player with a payout based on the outcome. Each input is capable of generating each of the outcomes.

The associated probability ranges of the inputs dictate the likelihood that the game generates any particular outcome based on the player's selection of an input. In one embodiment, the probabilities for each input add to one hundred. That is, when the player selects an input, there is a one hundred percent chance that the game generates one of the outcomes. This does not mean that each input has to be able to generate each outcome, but in one embodiment, each can. The probabilities for each outcome add up to be the same. That is, the probability of generating any particular outcome, before the player's selection of an input, is the same as for any other outcome.

The display device provides a number of visual, audio and audiovisual messages to the player. The display provides a message informing the player of the rules or sequence of the game, i.e., that there are certain selectable inputs, a plurality of outcomes for each input and an award associated with each outcome for each input. In one embodiment, the game displays another message providing the player a hint as to the payout structure. For instance, the message may inform the player of the probability that each input has for generating a particular outcome. This message aids the player in making a decision and lets the player know whether they are making a risky or safe selection.

The game may be adapted to have any number of inputs greater than one and any number of outcomes greater than one. In one embodiment, the game has three inputs and three outcomes. In one embodiment, the three inputs are represented by horses, the three outcomes are represented by place finishes, i.e., win, place and show, and the event is a horse race. Each horse or input has a probability of finishing first, second or third. The payouts vary depending on whether the horse is a favorite, a middle favorite or a long shot. As in real horse racing, the long shot pays more to win than does the favorite. Generally, each horse pays the least where it is expected to finish. The favorite pays the least to win. The middle horse pays the least to place. The long shot pays the least to show.

Each horse or input has the same expected value, so that the favorite pays the most to show in order to compensate for paying the least to win, etc. In real horse racing, betting the favorite or the "chalk" is the most conservative bet. Likewise, the present invention structures the paytable such that the favorite horse has the most conservative paytable (smallest payout range) and the long shot has the riskiest paytable (largest payout range), with the middle horse having a paytable with the middle range. The present invention may be adapted for any other display event having odds or other selectable items having varying risk/return scenarios.

The present invention can adapt the databases so that different horses or inputs have the same probability of achieving different outcomes or place finishes. Certain place finishes can yield a payout lower than the player's wager or the payout can be zero. The present invention can be implemented in a primary or secondary game of the gaming device. In a primary game, the present invention may be adapted to let the player increase the wager on a certain bet or to make various, different types of bets. In a bonus embodiment, the gaming device can provide the player with a starting amount of credits, wherein the player thereafter chooses whether to wager on a particular race and how much to wager on same.

The present invention enables the payer in certain embodiments to choose a combination of outcomes, e.g., an "exacta" or "perfecta" as the present invention pertains to horse racing. The combination bets may be made as a single selection or as the selection of two or more inputs or horses. In other embodiments, the player can select to wager on a place finish and/or on a combination outcome, just as in real horse racing.

It is therefore an advantage of the present invention to provide a gaming device that enables the player to play for more valuable and more risky awards or to play for less valuable and more likely awards.

It is another advantage of the present invention to provide a gaming device having an event wherein each player selection has the same expected value.

It is a further advantage of the present invention to provide a gaming device having an event wherein each outcome has probabilities a player would expect the outcome to have.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 6A through 6D are schematic views of one preferred embodiment of the present invention having a horse race event with three selectable horses and three place finishes, i.e., win, place or show.

FIG. 8 is a schematic view of yet another embodiment, wherein the player selects combinations of outcomes.

DETAILED DESCRIPTION OF THE INVENTION

Gaming Device and Electronics

Figure 1A:
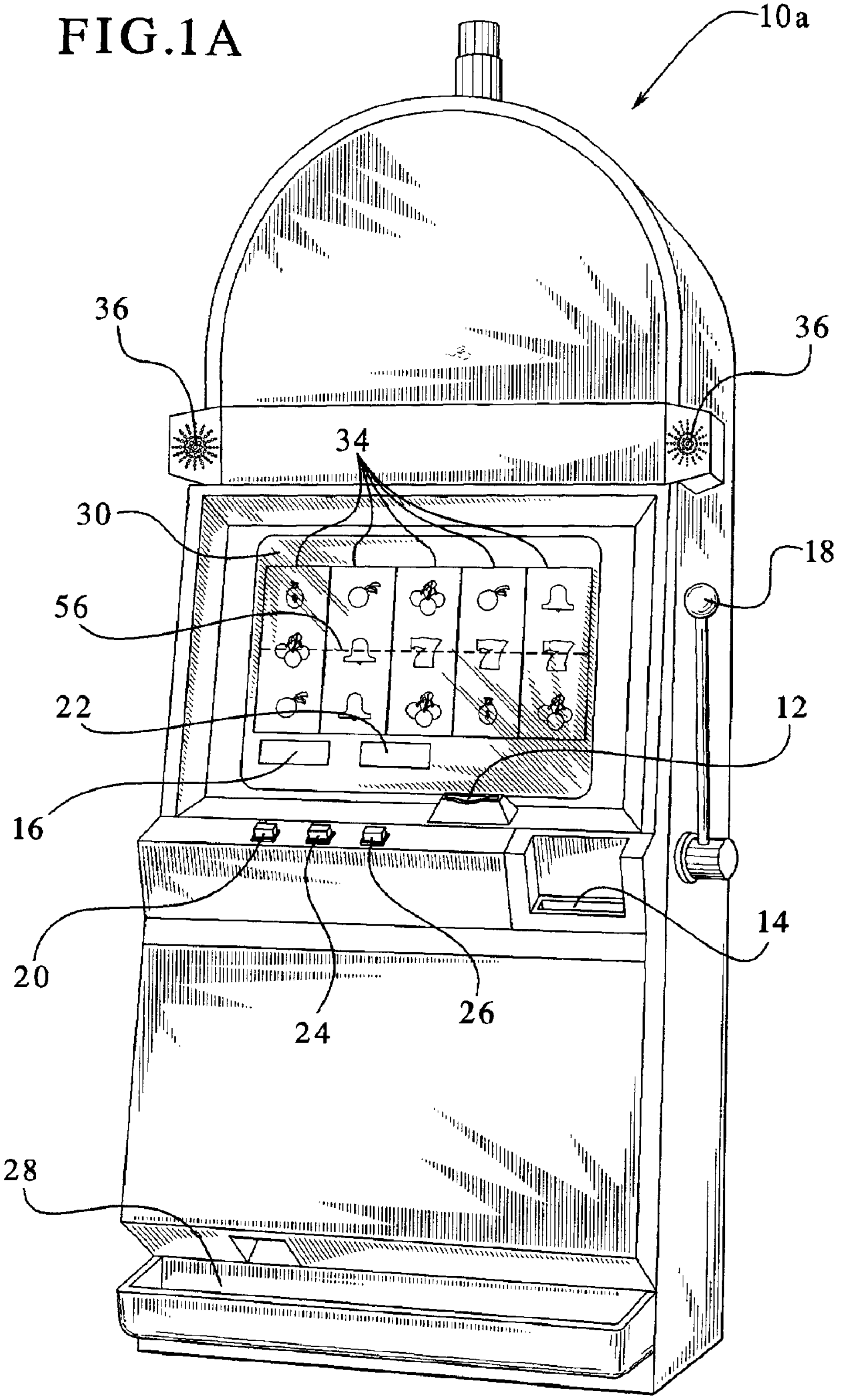
FIGS. 1A and 1B are perspective views of alternative embodiments of the gaming device of the present invention.
Figure 1B:
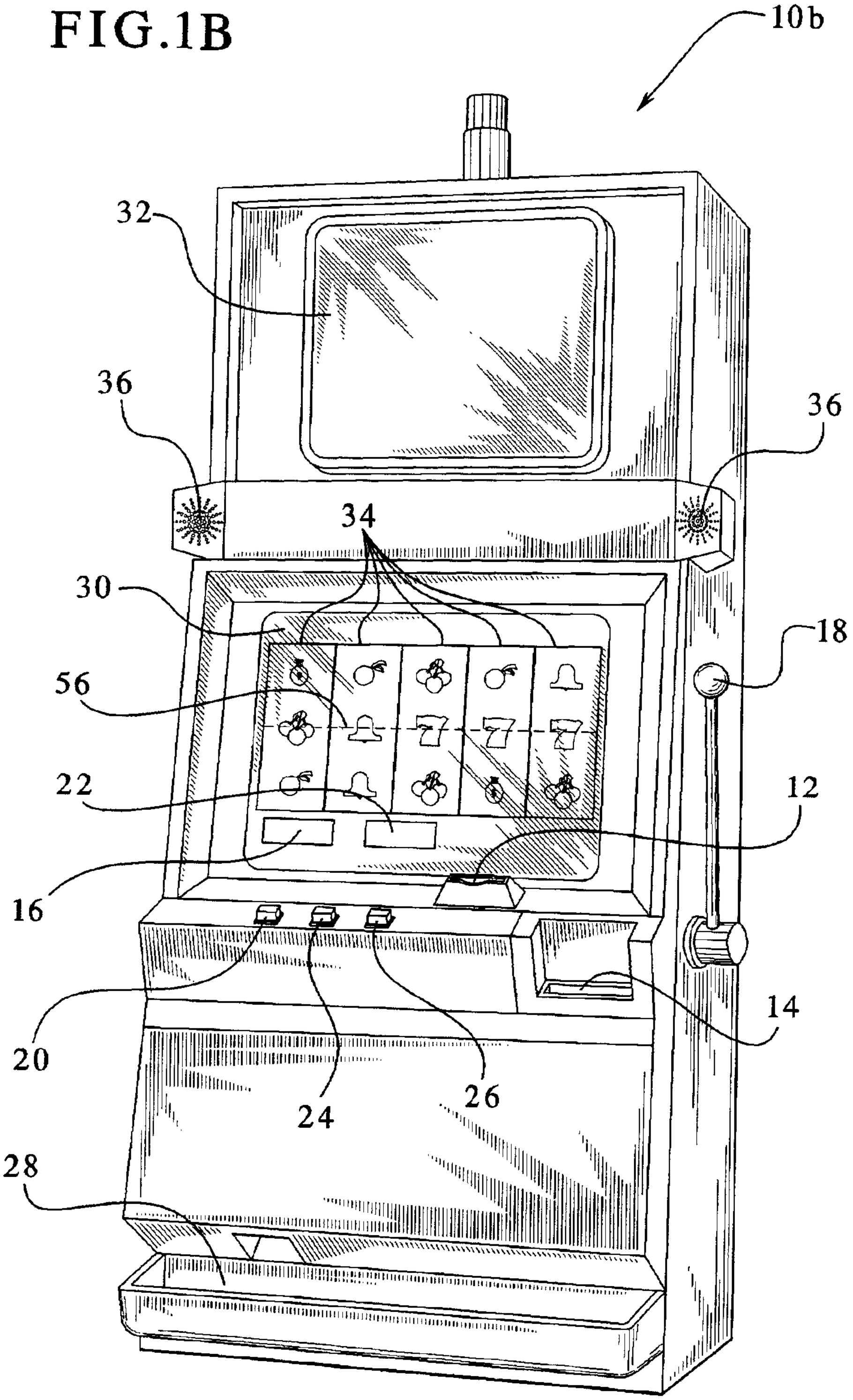

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 displays a plurality of reels 34, for example three to five reels 34, in mechanical or video form on one or more of the display devices. Each reel 34 displays a plurality of indicia such as bells, hearts, fruits, numbers, letters, bars or other images which correspond to a theme associated with the gaming device 10. If the reels 34 are in video form, the display device displaying the video reels 34 is, in one embodiment, a video monitor. Each base game, especially in the slot machine base game of the gaming device 10, includes speakers 36 for making sounds or playing music.

Figure 2:
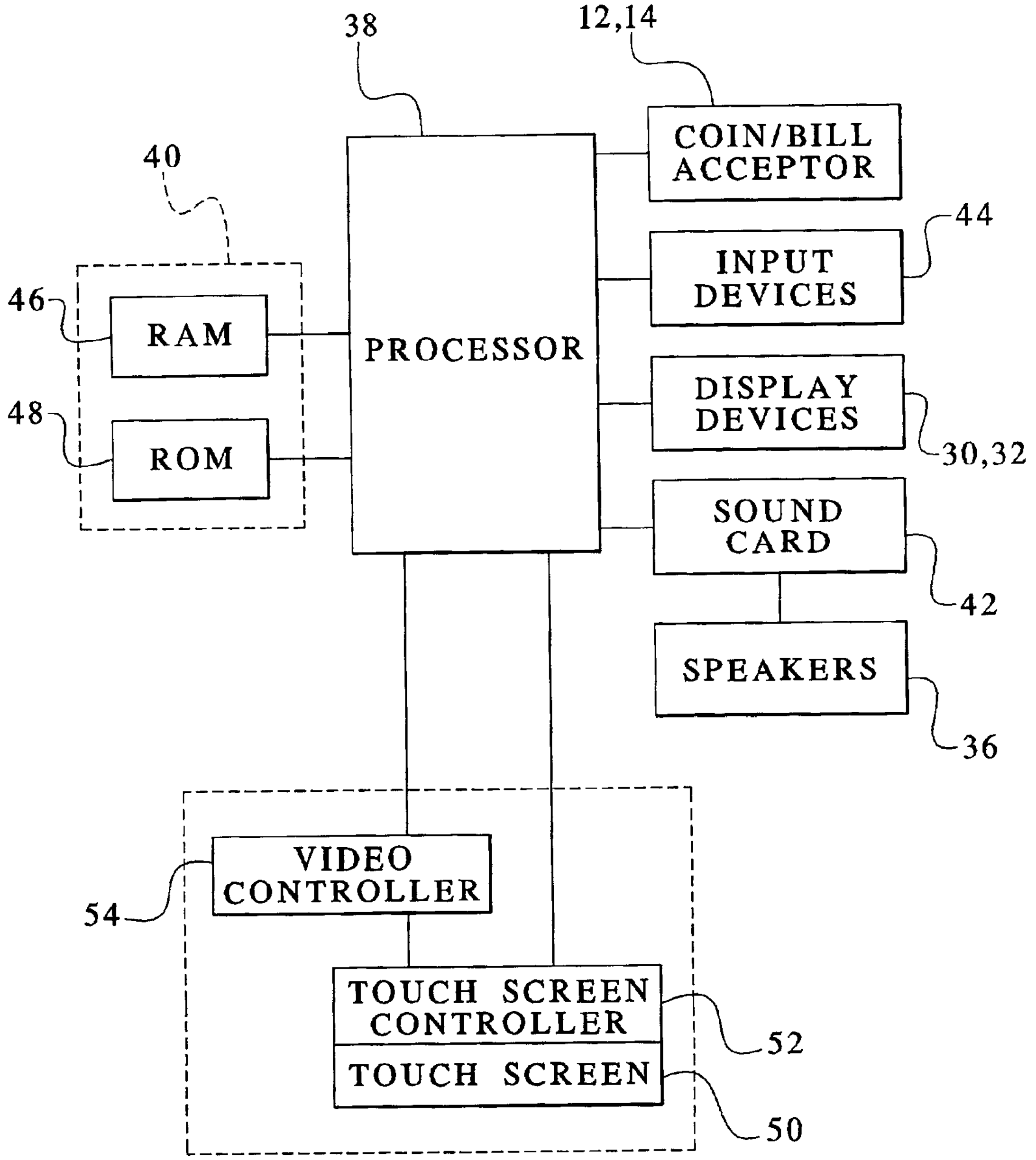
FIG. 2 is a schematic block diagram of the electronic configuration of one embodiment of the gaming device of the present invention.

Referring now to FIG. 2, a general electronic configuration for the stand alone and bonus embodiments described above includes: a processor 38; a memory device 40 for storing program code or other data; a central display device 30; an upper display device 32; a sound card 42; a plurality of speakers 36; and one or more input devices 44. The processor 38 is a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, a touch screen 50 and an associated touch screen controller 52 are provided instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that the present invention also includes being implemented via one or more application-specific integrated circuits (ASIC's), one or more hard-wired devices, or one or more mechanical devices (collectively referred to herein as a "processor"). Furthermore, although the processor 38 and memory device 40 reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Varying Risk Player Selections

Figure 3A:
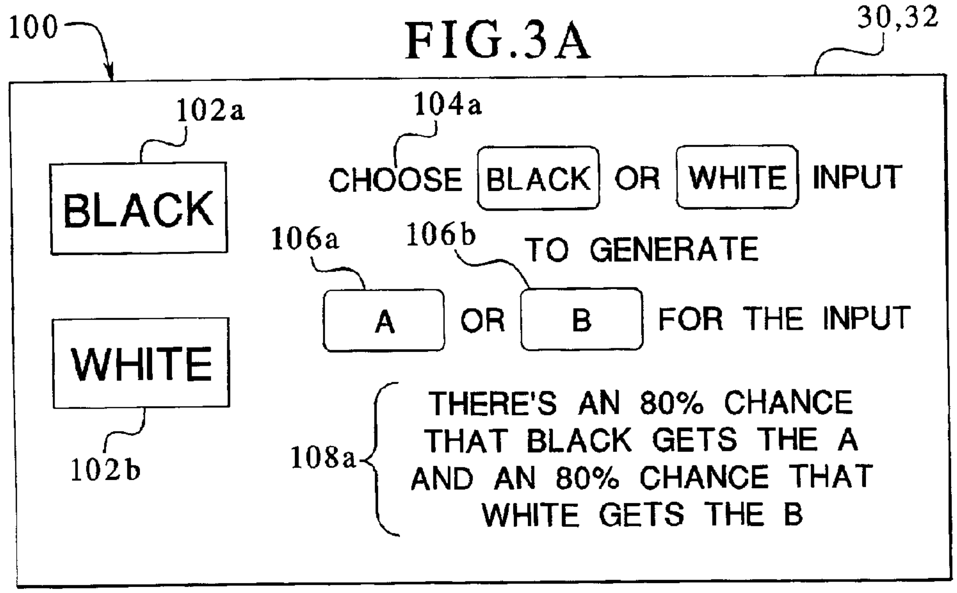
FIGS. 3A through 3D are schematic views of one embodiment of the present invention having two selectable inputs and two place finishes.

Referring now to FIG. 3A, one of the display devices 30 or 32 displays a screen 100. The screen 100 includes two inputs, namely, the Black input 102*a* and the White input 102*b*. The inputs can have any distinguishing indicia or symbols. The inputs, illustrated schematically in FIG. 2 as inputs 44, are adapted to communicate with the processor 38. The present invention generally provides player selectable inputs, such as touch screen inputs 102*a* and 102*b*.

However, the present invention may also be configured so that the processor 38 selects one or more inputs for the player. For example, gaming device 10 in one embodiment is configured to generate the Black and White inputs (or symbols representing same) on one or more of the reels 34. If gaming device 10 generates a predetermined number of the Black or White symbols (e.g., along a wagered payline or in a scatter scenario), the player enters the bonus round with the input 102*a* or 102*b* preselected by the reels 34. In a similar manner, a video poker base game in one embodiment preselects the input 102*a* or 102*b* via one or more playing cards. Further, the selection could be based on the player's wager, for example, playing above a certain number of paylines preselects the Black input for the player, while playing below that number of paylines preselects the White input.

In the illustrated embodiment, the Black input 102*a* and White input 102*b* are simulated areas of a touch screen 50 that are individually adapted to send a separate or discrete input to the processor 38. Alternatively, the inputs are externally mounted electromechanical pushbuttons, similar to the play button 20, bet one button 24 and the cash out button 26, which are individually connected to the processor 38.

The screen 100 includes an audio, visual or audiovisual message 104*a* that recites the rules or procedure of the gaming device 10. The message 104*a* informs the player that choosing or pressing the Black input 102*a* or the White input 102*b* will generate an "A" outcome 106*a* or a "B" outcome 106*b* that is associated with the selected input. When the player presses an input 102*a* or 102*b*, gaming device 10 performs a preferably exciting and enjoyable event in accordance with the theme of gaming device 10 (discussed below) and displays an outcome "A" or "B" for that input (discussed below).

The screen 100 includes an audio, video or audiovisual message 108*a* that informs the player of one or more pieces of information stored as data in memory that affect the outcome of the event based on the player's selection of a particular input. In one embodiment, the message 108*a* informs the player of the probability of generating a particular outcome 106*a* or 106*b* in association with picking a particular input 102*a* or 102*b*. As illustrated below, the message may be adapted to include more or different information.

Figure 3B:
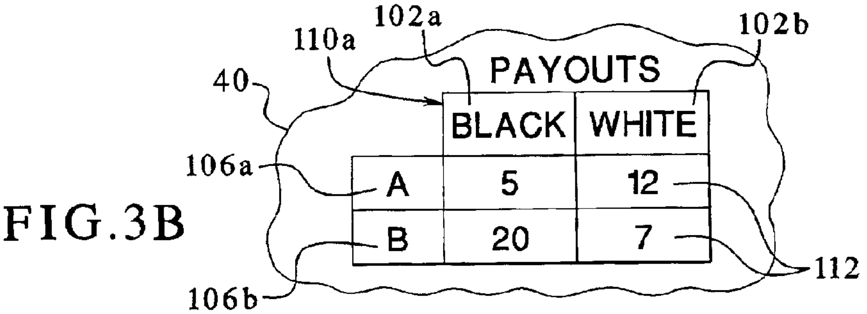

Referring now to FIG. 3B, an area of the memory device 40 stores a payout table 110*a* for the Black and White inputs 102*a* and 102*b* and the "A" and "B" outcomes 106*a* and 106*b*. Gaming device 10 awards values or payouts 112 to the player for playing same. Gaming device 10 may be adapted to award the values in a variety of ways. In one implementation, the payouts 112 are game credits that gaming device 10 adds to the player's total credits indicated in the credit display 16 (FIGS. 1A and 1B). The player can thereafter wager the payouts 112 or redeem them via the cash out button 26.

In another implementation, the payouts 112 are game credit multipliers. The multipliers multiply a quantity of game credits or a component of the player's bet to arrive at an award of game credits that are likewise added to the credit display 16. In an embodiment wherein the present invention is employed in a bonus game of a slot machine, the multipliers may be adapted to multiply the player's total bet, the bet per payline, the win on a particular payline, the total win from all active paylines, the number of paylines wagered or the player's total credits.

In a further implementation, the payouts 112 are a number of picks or selections from a prize pool or a number of free games. For instance, in an embodiment wherein the present invention is employed in a bonus game of a slot machine, the payouts 112 are a number of free spins of the reels 34 (FIGS. 1A and 1B). In an embodiment wherein the present invention is employed in a bonus game of a poker machine, the payouts 112 are a number of free hands or a number of wildcards that may be used in the base game of poker.

In one embodiment, the payout table 110*a* is adapted to provide a "risky" input 102*a* and a "safe" input 102*b*. When gaming device 10 includes more than two inputs, the paytables provide one or more intermediately risky inputs. In the paytable 110*a*, the Black input 102*a* is the risky input because it provides relatively high and low payouts 112. The White input 102*b* is the safe input because it provides intermediate payouts. That is, if the player picks the Black input 102*a*, the player obtains the best possible or worst possible payouts, and if the player picks the White input 102*b*, the player obtains one of a set of intermediate payouts. The range of payouts 112 is greatest for the risky input 102*a*, smaller for one or more intermediate inputs (not shown) and the smallest for the conservative input 102*b*.

Figure 3C:
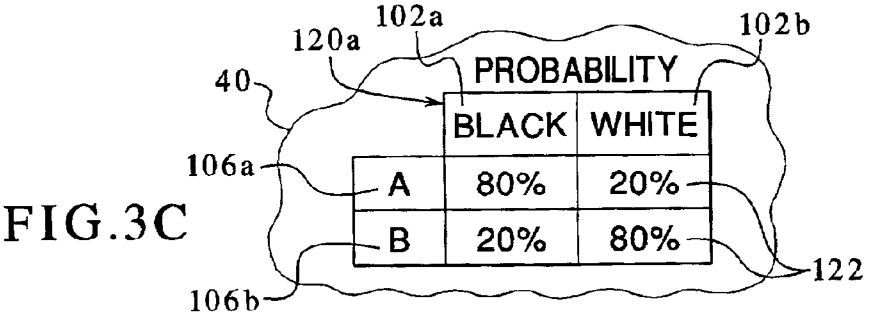

Referring now to FIG. 3C, an area of the memory device 40 stores a probability table 120*a* for the Black and White inputs 102*a* and 102*b*, and for the "A" and "B" outcomes 106*a* and 106*b*. Gaming device 10 employs probabilities 122 in randomly determining one of the outcomes based on the player's selection of one of the inputs. The total or sum of the probabilities 122 are one hundred percent for each input. That is, when the player selects one of the Black or White inputs 102*a* or 102*b*, the player has a one hundred percent chance of obtaining one of the "A" or "B" outcomes.

Likewise, the total probability of obtaining a particular outcome, adding the probabilities for each input, is the same or substantially the same for each outcome. In an embodiment such as the illustrated embodiment, wherein the number of inputs equals the number of outcomes, the total probability for each outcome is also one hundred percent. Although impracticable for the illustrated two input—two outcome embodiment, a probability 122 can be zero percent as long as the remaining probabilities 122 add to one hundred percent for each input.

The payout table 110*a* and the probability table 120*a* (illustrated separately for purposes of description, but which may be stored in the memory device 40 as a single table or set of data) are configured to enhance the risky input 102*a* versus safe input 102*b* feature. For instance, the payouts 112 for the Black input 102*a* become even riskier in combination with the probability table because if the player picks the Black input 102*a*, the probability table 120*a* provides an eighty percent chance that gaming device 10 randomly generates the five value and only a twenty percent chance that gaming device 10 generates the twenty value. The probability table 120*a* for the safe White input 102*b* is alternately adapted for each outcome 106*a* and 106*b* to make the probabilities 122 add to one hundred percent.

Figure 3D:
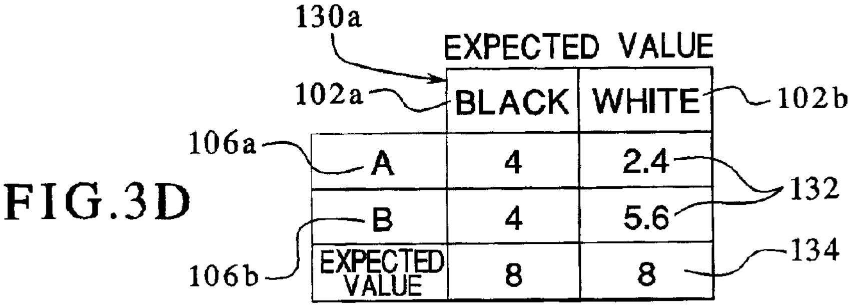

Although the paytable 110*a* and the probability table 120*a* do not have to be structured in such a way, gaming device 10 in one embodiment does not favor the choice of a risky input 102*a* versus a choice of a safe input 102*b*. Referring now to FIG. 3D, an expected value table 130*a* for the Black and White inputs 102*a* and 102*b* illustrates that the total expected value 134, i.e., the average expected payout 132, is eight credits regardless of whether the player chooses the risky Black input 102*a* or the safe White input 102*b*.

The expected value 132 for a given input and outcome is the payout 112 multiplied by its respective probability 122. The total expected value 134 for each input 102 is the sum of the expected values 132 for the individual outcomes 106*a* and 106*b*. The expected value table 130*a* predicts that through random generation, if the player plays gaming device 10 one hundred times and plays the Black input 102*a* or the White input 102*b* all one hundred times, the player should accumulate eight hundred credits either way. Note that the expected values 132 for the different outcomes 106*a* and 106*b* do not have to accumulate to the same total expected value. That is, the total expected value across the "A" outcome row is 6.4, while the total expected value across the "B" outcome row is 9.6. Note also that the payouts 112 for each input column do not have to accumulate to the same number.

The message 108*a*, informing the player of one or more pieces of information that affect the outcome of the displayed event, may be adapted to include any one or more of the payouts 112 and/or the probabilities 122 or any combination thereof. For example, in one embodiment, the message 108*a* may be adapted to inform the player that picking the Black input 102*a* will yield a five or twenty award and that picking the White input 102*b* will yield a seven or twelve award. In another example, the message 108*a* may be adapted to inform the player that there's an eighty percent chance of receiving a five award by picking the Black input 102*a* and an equal eighty percent chance of receiving a seven award by picking the White input 102*b*. The screen 100 can display different messages 108*a* in different games.

Referring now to FIGS. 4A through 4D, another embodiment of the present invention includes the same two inputs 102*a* and 102*b* and four outcomes 106*a*, 106*b*, 106*c* and 106*d*. It should be appreciated that the present invention is adaptable to include any combination of inputs and outcomes, as long as there is at least two of each. In the screen 140 of FIG. 4A, the message 104*b* outlining the rules or sequence of gaming device 10 specifies that choosing either the Black or White input 102*a* or 102*b* generates one of four outcomes 106*a*, 106*b*, 106*c* and 106*d* for the selected input.

Figures 4A, 4B, 4C, 4D:
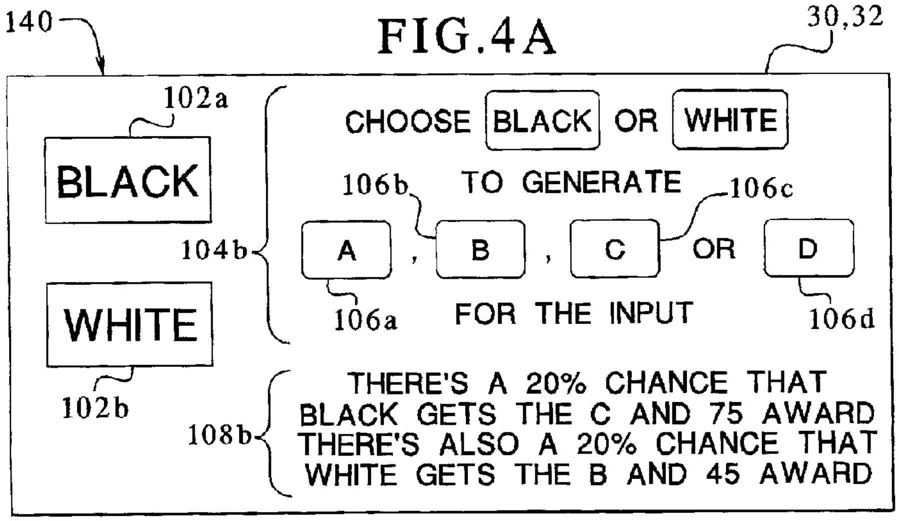
FIGS. 4A through 4D are schematic views of another embodiment of the present invention having two selectable inputs and four place finishes.

The payout table 110*b* of FIG. 4B is stored in an area of the memory device 40 for the Black and White inputs 102*a* and 102*b* and the "A" through "D" outcomes 106*a* to 106*d*. As before, the payouts 112 for each input 102 do not have to add to the same value. Here, the total Black input payouts 112 add to two hundred ten. The total White input payouts 112 add to one hundred seventy five.

The probability table 120*b* of FIG. 4C is stored in an area of the memory device 40 for the Black and White inputs 102*a* and 102*b* and the "A" through "D" outcomes 106*a* to 106*d*. As before, the probabilities 122 for each input add to one hundred percent. Unlike the embodiment in FIGS. 3A through 3D, however, the probabilities 122 across each outcome row do not add to one hundred percent. The probability totals for each outcome row are all, however, the same, i.e., fifty percent. The disparity between the number of outcomes and inputs in FIGS. 4A through 4D causes probabilities in each outcome row to add to less than one hundred percent.

The expected value table 130*b* of FIG. 4D for the Black and White inputs 102*a* and 102*b* illustrates that the total expected value 134, i.e., the average expected payout 132, is thirty-six credits regardless of whether the player chooses the risky Black input 102*a* or the safe White input 102*b*. The total expected value 134 for each input 102*a* or 102*b* is the addition of expected value components 132 in each input column.

The Black input 102*a* is riskier because while the player has a ten percent probability 122 to obtain a payout 112 of one hundred by picking the Black input, the player has a forty percent probability 122 to obtain a payout 112 of only five by picking the same input 102*a*. If the player picks the safe White input 102*b*, the smallest payout 112 is twenty, while the largest is only seventy and the player has a fifty percent probability 122 of obtaining a payout 112 of forty or forty-five. The range of payouts 112 is greater for the risky Black input 102*a* than it is for the safe White input 102*b*.

The message 108*b* that informs the player of one or more pieces of information that affect the outcome of the displayed event, may be adapted to include any one or more of the payouts 112 and/or the probabilities 122 for the outcomes "A" through "D." In the screen 140, the message 108*b* informs the player that the Black input 102*a* has a twenty percent probability 122 of yielding a payout 112 of seventy-five, while the White input 102*b* has a twenty percent probability 122 of yielding a payout 112 of forty-five.

The embodiments disclosed herein illustrate that each input has the same number of outcomes. For example, in FIGS. 3A to 3D, the inputs 102*a* and 102*b* can each yield one of the "A" or "B" outcomes 106*a* and 106*b*. In FIGS. 4A to 4D, the inputs 102*a* and 102*b* can each yield one of the "A" to "D" outcomes 106*a* to 106*d*. In an alternative embodiment, the inputs can have differing numbers of outcomes. For example, in FIGS. 4A and 4B, one of the inputs 102*a* and 102*b* could be configured to yield only two or three outcomes.

In one implementation of gaming device 10 in FIGS. 4A to 4D, the "safe" White input 102*b* is configured not to have outcomes "A" or "D", but to only have the middle outcomes "B" and "C". Two of the expected values 132 for the White input 102*b* will thus be zero. As long as the middle two expected values add to thirty-six credits, the total expected value 134 for the "risky" Black input, the player has the same overall expected value regardless of which input, 102*a* or 102*b*, the player chooses.

Although the probabilities 122 disclosed herein generally differ for different inputs, the probabilities could be the same for two or more inputs. The same probabilities could correspond to the same or different payouts 112. In the previously disclosed implementation of FIGS. 4A to 4D, for example, the two middle probabilities 122 could be the same, i.e., fifty percent, wherein each corresponding middle payout 112 is thirty-six credits (yielding a total expected payout 134 of thirty-six credits). In another example, the two middle probabilities 122 could be the same, i.e., fifty percent, wherein one payout 112 is forty credits and the other payout is thirty-two credits (yielding a total expected payout 134 of thirty-six credits).

Referring now to FIGS. 5A through 5D, another embodiment of the present invention includes three inputs 102*a*, 102*b* and 102*c* and two outcomes 106*a* and 106*b*. In the screen 150 of FIG. 5A, the message 104*c* outlining the rules or sequence of gaming device 10 specifies that choosing either the Black, Gray or White input 102*a*, 102*b* or 102*c* generates one of two outcomes 106*a* or 106*b* for the selected input.

Figures 5A, 5B, 5C, 5D:
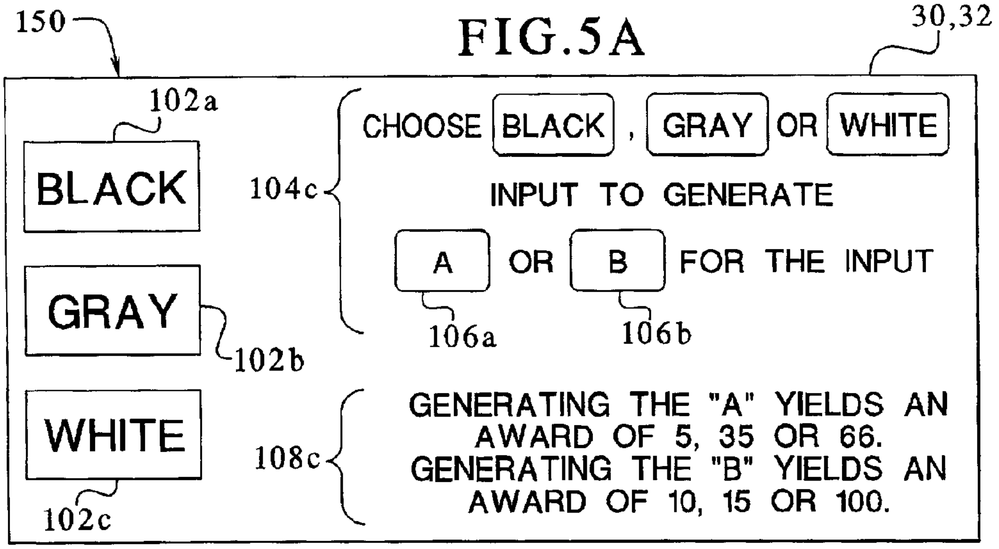
FIGS. 5A through 5D are schematic views of a Further embodiment of the present invention having three selectable inputs and two place finishes.
Figure 6A:
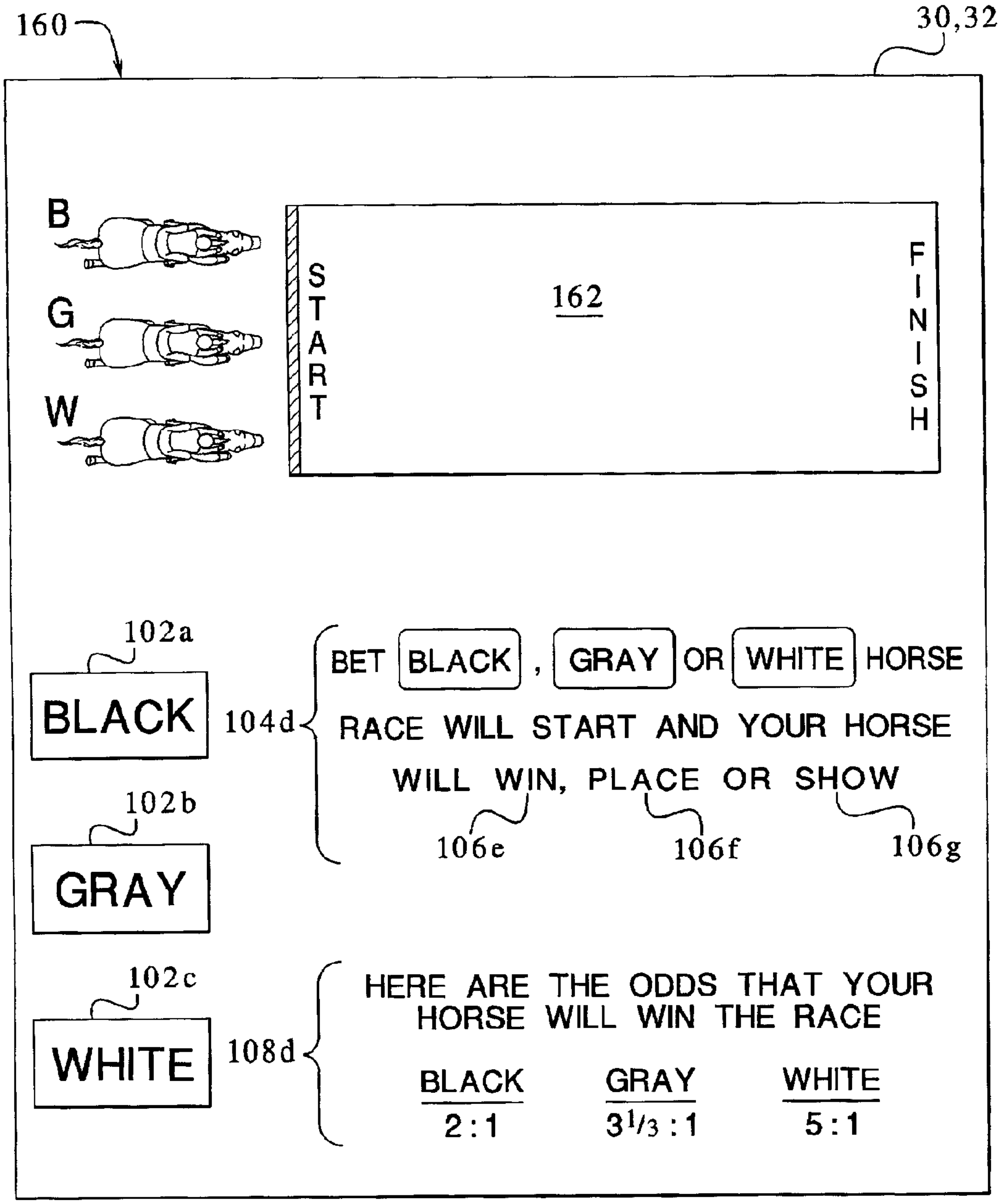

The payout table 110*c* of FIG. 5B is stored in an area of the memory device 40 for the Black, Gray and White inputs 102*a* to 102*c* and the two outcomes 106*a* and 106*b*. As before, the payouts 112 for each input do not have to add to the same value. Here, the total payouts 112 for the Black column add to one hundred five. The total Gray payouts 112 add to seventy-six. The total White payouts 112 add to fifty.

The probability table 120*c* of FIG. 5C is stored in an area of the memory device 40 for the Black, Gray and White inputs 102*a*, 102*b* and 102*c* and the two outcomes 106*a* and 106*b*. As before, the probabilities 122 for each input column add to one hundred percent. Unlike the embodiment in FIGS. 3A through 3D, however, the probabilities 122 for each outcome row do not add to one hundred percent. The probability totals for each outcome row are all, however, the same, i.e., one hundred fifty percent. The disparity between the number of inputs and outcomes in FIGS. 5A through 5D causes probabilities to add to more than one hundred percent.

The expected value table 130*c* for the Black, Gray and White inputs 102*a* to 102*c* illustrates that the total expected value 134, i.e., the average expected payout 112, is twenty-four credits regardless of whether the player chooses the risky Black input 102*a*, the intermediate Gray input 102*b* or the safe White input 102*c*. The total expected value 134 for each input is the addition of expected value components 132 in each column.

The Black input 102*a* is the riskiest because while the player has a twenty percent probability 122 to obtain a payout 112 of one hundred by picking the Black input, the player has an eighty percent probability 122 to obtain a payout 112 of only five by picking the same input 102*a*. If the player picks the somewhat risky Gray input, there is a seventy-five percent probability 122 that the player receives a payout 112 of only ten and twenty-five percent probability 122 that the player receives a payout 112 of sixty-six. If the player picks the safe White input, the player has a roughly equal probability 122 of receiving a payout 112 of fifteen or thirty-five. The range of payouts 112 is the greatest for the risky Black input, second for the intermediate Gray input and the smallest for the safe White input.

In the screen 150, the message 108*c* disclosing information that affects the outcome of the displayed event, discloses the payouts 112 of the paytable 110*c* as they correspond to the outputs 106*a* and 106*b*. That is, the message 108*c* informs the player that the "A" outcome 106*a* yields five, thirty-five or sixty-six credits. Generating the "B" outcome 106*b* yields ten, fifteen or one-hundred credits. The player, however, does not know which input 102*a* to 102*c* will yield which payout 112.

Referring now to FIGS. 6A through 6D, one preferred embodiment of the present invention is illustrated. The screen 160 of FIG. 6A displays a horse race event on one of the display devices 30 or 32. The inputs 102*a* to 102*c* enable the player to pick or bet on a Black horse, Gray horse or White horse. The message 104*d* informs the player to bet the Black, Gray or White horse, whereby gaming device 10 starts a race that determines one of a win, place or show outcome 106*e*, 106*f* and 106*g* for the selected input. The message 108*d* posts the odds of each horse winning the race or obtaining a win outcome. In this implementation, the Black horse is the favorite or the "chalk" at 2:1, the Gray horse is the next favorite at 31/3:1 and the White horse is the "long shot" at 5:1.

The message 108*d* may also include payout information from the paytable 110*d* and place or show information from the probability table 120*d*. However, most players familiar with horse racing know that the longer the odds to win, the better the horse pays. The player intuitively knows that the Black horse pays less to win than does the Gray horse or the White horse. Further, the player intuitively knows that the White horse is the riskier horse, the middle horse is less risky and the favorite is the most conservative horse.

The payout table 110*d* of FIG. 6B is stored in an area of the memory device 40 for the Black, Gray and White horse inputs 102*a* to 102*c* and the win, place and show outcomes 106*e*, 106*f* and 106*g*. As before, the payouts 112 for each input 102*a* to 102*c* do not have to add to the same value. Here, the total Black horse payouts 112 add to one hundred thirty-two. The total Gray horse payouts 112 add to one hundred twenty-five. The total White horse payouts 112 add to one hundred sixty.

The probability table 120*d* of FIG. 6C is stored in an area of the memory device 40 for the Black, Gray and White inputs 102*a* to 102*c* and the three outcomes 106*e* to 106*g*. As before, the probabilities 122 for each horse add to one hundred percent. Here, since the number of outcomes; namely, the first, second and third place outcomes, equals the number of inputs, the probabilities 122 for each of the first, second and third place outcomes are the same and add to one hundred percent.

The expected value table 130*d* for the Black, Gray and White horse inputs 102*a* to 102*c* illustrates that the total expected value 134, i.e., the average expected payout 112, is forty credits regardless of whether the player chooses the risky White horse 102*c*, the intermediate Gray horse 102*b* or the safe Black horse 102*a*. The total expected value 134 for each input is the addition of expected value components 132 for each of the first, second and third place outcomes 106*e* to 106*g*.

In this example, the White horse 102*c* is the riskiest. While the player has a twenty percent probability 122 to obtain a payout 112 of one hundred by picking the White horse, the player has a fifty percent probability 122 of obtaining a payout 112 of only ten, which is well below the expected value 134 of forty. If the player picks the less risky Gray horse, there is still a seventy percent probability 122 that the player achieves under the expected value 134. If the player picks the safe Black horse, the player has a fifty percent probability 122 of achieving at or above the expected value 134. The risky White horse has the largest payout 112 range of ninety (100–10). The Gray horse has the second largest payout 112 range of sixty. The conservative Black horse has the smallest payout 112 range of twenty-eight.

When the player selects a horse input, gaming device 10 displays the event or horse race on an area 162 of a display device 30 or 32. For the ease of illustration, the event display area 162 is illustrated on the same screen as the inputs 102*a* to 102*c* and messages 104*d* and 108*d*. It should be appreciated that a separate display device may be adapted to display the horse race event. The event includes the horses racing in an exciting and entertaining manner. The horses finish in first place, second place, third place in accordance with outcomes 106*e* to 106*g* that gaming device 10 randomly generates using the probability table 120*d*. From the description above, it should be apparent that the horse race embodiment may be adapted to include any number of horse inputs and any number of place finish outcomes.

If the payout 112 for a first place finish by the favorite horse, e.g., the Black horse, is set significantly below the expected value 134, that game may be adapted to provide a consolation award to the player. In such a case, gaming device 10 provides the award when the player bets the favorite to win and the random outcome determines that the favorite wins. Gaming device 10 may also provide a separate bonus sequence in connection with the consolation award. In this case the total expected value 134 for the favorite horse input 102*a* is slightly higher than for the remaining horse inputs 102*b* and 102*c*. The consolation award provides an incentive for the player to make a selection and hope that the selected horse wins as opposed to finishing second or third.

The horse race embodiment is only one possible display embodiment for the present invention. As it is described generally in FIGS. 3A through 5D, the present invention may be adapted for any racing competition having first, second, third, etc., place outcomes. Gaming device 10 may be adapted for any event having different selectable risk/return scenarios. For instance, gaming device 10 may be adapted to chart the progress of a risky growth stock, a less risky blue-chip stock or a conservative income stock. Further, any event having odds, such as a prize fight or a football game easily adapts to employ the present invention.

Figure 7:
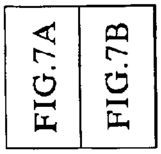
FIGS. 7, 7A, and 7B are a schematic views of a further embodiment, wherein the database of the present invention stores a plurality of game scenarios that are interchangeably used.
Figure 7A:
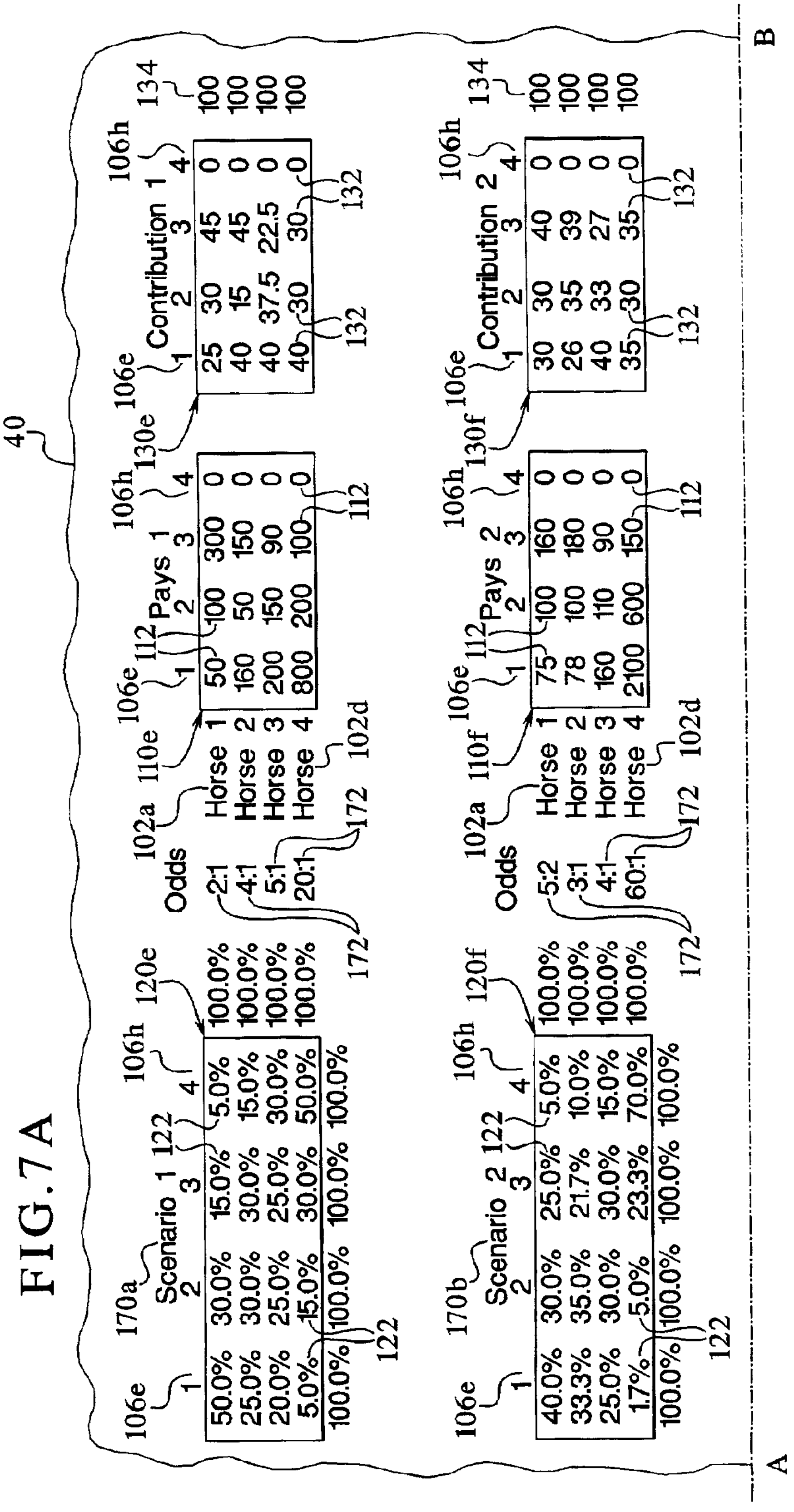
Figure 7B:
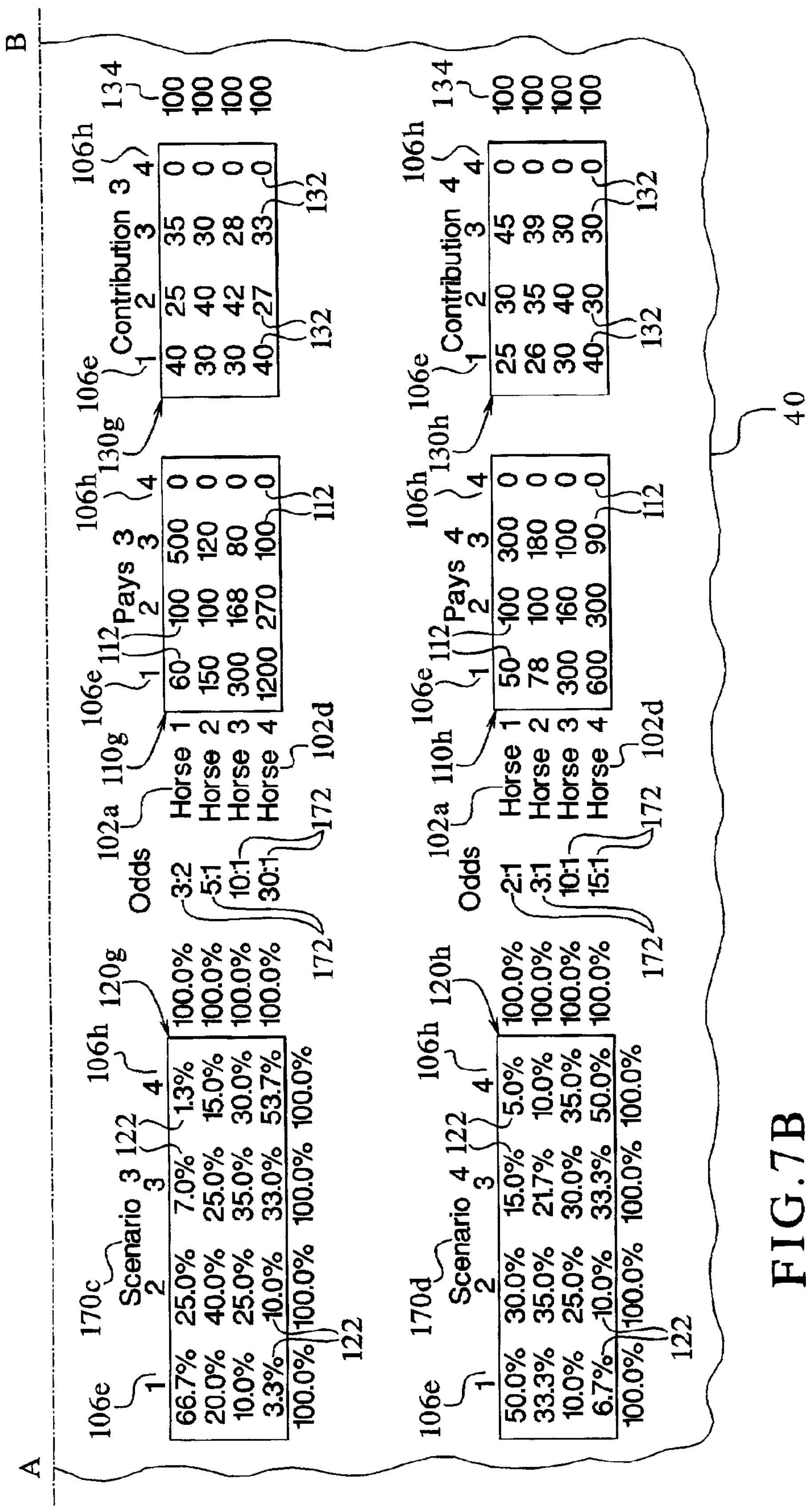

Referring now to FIGS. 7,7A, and 7B in one embodiment, the memory device 40 stores different scenarios 170*a* to 170*d*, which provide different probability and payout distributions. The scenarios 170*a* to 170*d* differ in terms of: (i) the probabilities 122 used; (ii) the odds 172 posted for each contestant or horse 102*a* to 102*d*; (iii) the payouts 112 made; and (iv) the resulting expected value 132 for each horse and each place finish or outcome (first 106*e* to fourth 106*h*). It should be appreciated, however, that the total expected value 134 for each input or choice 102*a* to 102*d* is the same for each scenario 170*a* to 170*d*.

Each of the previous embodiments have been disclosed, wherein the total expected values 134 for each input or choice add to the same amount. As the scenarios become more complex, so that the intermediate expected values 132 have fractions of a credit, it is possible that one or more of the total expected values 134 is slightly higher or lower than the other expected values or average expected payout. The present invention therefore expressly contemplates the total expected values for the various inputs being substantially the same. For example, substantially the same can mean within one credit above and below the other expected values or average expected payout.

The scenarios 170*a* to 170*d* are stored in an area of the memory device 40. Gaming device 10 in one embodiment randomly selects one of the scenarios 170*a* to 170*d* to employ in a primary or secondary game of the present invention. In an alternative embodiment, gaming device 10 employs a predetermined order for using one of the scenarios 170*a* to 170*d*. Either way, the different scenarios add variety to gaming device 10. For example, gaming device 10 as illustrated above, likely displays at least some of the odds 172 to the player. The different scenarios result in races having horses that post different odds.

Each scenario includes a plurality of choices 102*a* to 102*d*, which in an embodiment correspond to horses of a horse race. The scenarios include probability tables 120*e* to 120*h* for the inputs 102*a* to 102*d* and outcomes 106*e* to 106*g*. As before, the probabilities 122 for each horse add to one hundred percent. Here, since the number of outcomes; namely, the first, second, third and forth place outcomes, equals the number of inputs, the probabilities 122 for each of the outcomes add to one hundred percent.

Each scenario 170*a* to 170*d* includes a corresponding payout table 110*e* to 110*h*. As before, the payouts 112 for each input 102*a* to 102*d* do not have to add to the same value. For example, in the paytable 110*e* of scenario 170*a*, Horse 1 payouts 112 add to four hundred fifty. Horse 2 payouts 112 add to three hundred sixty. Horse 3 payouts 112 add to four hundred forty. Horse 4 payouts 112 add to eleven hundred.

In each of the scenarios 170*a* to 170*d*, the horses 102*a* to 102*d* pay nothing if the horse finishes fourth or last. This type of distribution is useful in a base or primary game, wherein the player may not win back the amount of the wager. In such a case, gaming device 10 can provide for a multitude of payouts 112 that pay less than the player's wager, or as illustrated pay nothing. For example, as in real horse racing, gaming device 10 can provide a ten horse field, wherein only the first, second and third place horses pay.

In bonus games, the player preferably wins some award amount, even if small. Gaming device 10 can structure the paytables 110*e* to 110*h* as illustrated and allow the player to choose multiple horses. As long as gaming device 10 allows the player to choose at least one more input or horse than there are non-paying outcomes, gaming device 10 guarantees, in a bonus embodiment, the player at least a small payout. The non-paying outcomes also provide variability to the gaming experience.

Each scenario 170*a* to 170*d* includes a corresponding expected value table 130*e* to 130*h*. In each scenario, the total expected value 134, i.e., the average expected payout 112, is one hundred credits regardless of whether the player chooses the favorite Horse 1, one of the intermediate Horses 2 or 3 or the long shot, Horse 4.

Although each illustrated scenario includes the same number of inputs or horses, it is possible that other scenarios can have a different number of horses. In such a case, regardless of the number of possible choices, the expected value for each choice in one embodiment does not vary. That is, even if one of the scenarios provides five horses, each horse maintains an expected value of one hundred. Thus, if gaming device 10 provides two picks, the player's total expected value is two hundred.

Gaming device 10 could also provide a different amount of picks to the player in different scenarios, wherein to keep the average payout a constant, the horses in the varying scenarios would have different expected values. For example, one scenario could provide the player with one pick, wherein the expected value of each horse is one hundred, and another scenario could provide the player with two picks, wherein the expected value of each horse is fifty. In another embodiment, gaming device 10 provides the player with an option such as, "Do you want to play one or two horses?", wherein gaming device 10 selects a scenario based on the player's preference. In any case, the overall expected value of each race remains the same.

Referring now to FIG. 8, in one embodiment, the memory device 40 stores different scenarios 180*a* to 180*d*, which provide different probability and payout distributions for a multiple horse selection, known in the art of horse racing as an exacta. Here, the player attempts to choose which two horses will obtain the first two outcomes, that is, which two horses will come in first and second. These first two original outcomes are then used in determining the existence of an additional outcome, such as the outcome of an exacta wager. In an embodiment, the exact order of the horses finishing first and second is not important (known as a boxed exacta), as long as the player chooses the correct two horses.

In a slight variation, gaming device 10 in an alternative embodiment enables the player to select a particular combination 182*a* to 182*f* instead of picking the individual inputs or horses associated with the combination. For example, gaming device 10 is structured in one embodiment to let the player pick Horse 1 and Horse 2 individually to pick the boxed exacta combination 182*a*. Alternatively, gaming device 10 provides a selection dedicated to the Horse1/Horse2 combination 182*a*.

The scenarios 180*a* to 180*d* differ in terms of: (i) the probabilities used (shown under the headings 120*i* to 120*l*); (ii) the payouts made (shown under headings 110*i* to 110*l*); and (iii) the resulting expected value (shown under headings 130*i* to 130*l*) for each win/place combination 182*a* to 182*f* of the scenarios 180*a* to 180*d*. The average expected value 184*a* to 184*f* for each scenario, however, is approximately the same.

As discussed in connection with FIGS. 7, 7A, and 7B the various scenarios 180*a* to 180*d* provide variety to gaming device 10. In each scenario, the average expected values 184*a* to 184*f* dictate that the player has roughly the same chance of winning the same amount, that is, about fifty credits. Gaming device 10 can randomly employ the scenarios 180*a* to 180*d* or do so in a predetermined order. Obviously, the embodiments of FIGS. 7, 7A, 7B, and 8 can include any number of scenarios.

In operation, the gaming device 10 in FIG. 8 provides, for example, four horses, which yield six possible boxed win/place combinations 182*a* to 182*f*. Gaming device 10 could alternatively let the player choose three horses, wherein two of the three must finish, in either order, one and two. In another alternative embodiment, gaming device 10 provides a non-boxed exacta, which would have twelve combinations for the four horse field. The player would have to select the horse and the place finish, that is, a win finish or a place finish.

It should be appreciated from the foregoing discussion that gaming device 10 in yet another alternative embodiment can provide a trifecta, wherein the player has to choose which horses finish first, second and third. As before, the trifecta in one embodiment is boxed (exact order of win/place/show does not matter) and in another embodiment is unboxed (order of win place or show horses does matter).

In one embodiment, gaming device 10 enables the player to make a plurality of different kinds of bets, such as picking one or more horses to win, place or show, picking a boxed or unboxed exacta or picking a boxed or unboxed trifecta. The player can bet the same horse to win and at the same time bet the horse as part of an exacta or a trifecta. As shown above, gaming device 10 can manipulate the number of player (or gaming device) selections so that the overall expected value for the race is the same regardless of the type of wager the player makes.

In still another alternative embodiment, gaming device 10 in a base or primary game enables the player to wager a higher amount of money and increase the overall expected value for the race. For example, gaming device 10 in one embodiment provides an option to the player of wagering one credit, wherein gaming device 10 enables the player to make one pick of a horse to finish first, second or third. Or, the player can wager two credits, wherein gaming device 10 enables the player to pick two horses to finish first, second or third, and so on. In this way, like in actual horse racing, the player can build various wagering schemes based on the posted odds of the horses, wherein the player can wager more or less for each race.

In still a further embodiment, in a bonus game, gaming device 10 provides the player with an initial amount of money, for example, one hundred credits. Gaming device 10, just like in real horse racing, schedules a race day with a number of races, for example, eight races. In each race, the player can wager different amounts of credits on the various types of horse race wagers described above, until the player runs out of bonus credits or the race day ends. If the player wins in the early races, the player can wager more in the later races or keep the winnings. At the end of the race day, for example, eight races, the player's bonus win is whatever amount is left, for example, some amount more or less than one hundred credits.

During the race day, the player can also decline to wager on one or more of the races or cash out altogether, for example, via a "leave the track" button. Just like in real horse racing, certain races may be featured races and have bigger payouts, wherein the player would wish to save some money to play the bigger payout races.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

What is claimed is:

1. A gaming device comprising:

a first selection having a first outcome and a second different outcome;

a second selection having a first outcome and a second different outcome;

a probability of achieving the first outcome of said first selection being higher than a probability of achieving the first outcome of said second selection;

a payout associated with the first outcome of said first selection being lower than a payout associated with the first outcome of said second selection;

a probability of achieving the second outcome of said first selection being lower than a probability of achieving the second outcome of said second selection;

a payout associated with the second outcome of said first selection being higher than a payout associated with the second outcome of said second selection, wherein the payouts and probabilities are configured such that a total expected value for the first selection at least approximately equals a total expected value for the second selection; and a processor for:

(i) causing one of the selections to be selected, (ii) determining one of the outcomes for said selected selection, wherein said outcome is determined based on the probabilities associated with said selected selection, and (iii) providing a player one of the payouts based on the outcome of the selected selection.

2. The gaming device of claim 1, wherein the probabilities are configured so that a sum of all of the probabilities for the first selection at least approximately equals a sum of all of the probabilities for the second selection.

3. The gaming device of claim 1, wherein the probabilities are configured so that a sum of all of the probabilities for the first outcome at least approximately equals a sum of all of the probabilities for the second outcome.

4. The gaming device of claim 1, which includes a display device controlled by the processor which displays the selections and an indication of the probability that one of the selections will generate one of the outcomes.

5. The gaming device of claim 1, which includes a display device controlled by the processor which displays an indication of the probabilities that either selection will generate one of the outcomes.

6. The gaming device of claim 1, which includes a display device controlled by the processor which displays an indication of the payout that one of the selections will provide for generating one of the outcomes.

7. The gaming device of claim 1, which includes a display device controlled by the processor which displays an indication of the payouts that either selection will provide for generating one of the outcomes.

8. The gaming device of claim 1, wherein the lower payout associated with the first selection and the first outcome is different than the lower payout associated with the second selection and the second outcome.

9. The gaming device of claim 1, which includes a range of payouts associated with the first selection that is greater than a range of payouts associated with the second selection.

10. The gaming device of claim 1, wherein the first and second selections are player selectable.

11. The gaming device of claim 1, wherein one of the first and second selections is selected by the processor.

12. The gaming device of claim 1, wherein one of the first and second selections is selected based on the player's wager.

13. The gaming device of claim 1, wherein at least one of the payouts is less than a wager made by the player.

14. The gaming device of claim 1, wherein at least one of the payouts is zero.

15. The gaming device of claim 1, which includes a plurality of selections, a plurality of outcomes associated with each selection, and a payout associated with each outcome, wherein the payouts for each selection add to substantially the same amount.

16. A gaming device having a game comprising:

a plurality of different selectable selections;

a plurality of different outcomes associated with each selection;

a probability associated with each outcome, wherein at least two of the selectable selections have at least two different probabilities associated with two different outcomes and wherein each outcome is determined based on said probabilities associated with said selection; and a payout associated with each outcome, wherein a sum of the payout multiplied by the probability for each outcome forms an expected value for each selection, and wherein the expected values for each different selection is substantially the same amount.

17. The gaming device of claim 16, wherein multiple selections are selected and a player receives the payouts associated with the outcomes determined for the selected multiple selections.

18. The gaming device of claim 17, wherein the selected multiple selections are player selected.

19. The gaming device of claim 16, wherein the outcomes are original outcomes, and which includes additional outcomes and payouts associated with the additional outcomes, wherein the additional outcomes are combinations of the original outcomes.

20. The gaming device of claim 19, wherein the game is a primary game which includes a means for enabling a player to wager an additional amount to play for at least one additional outcome.

21. The gaming device of claim 19, which includes means for enabling a player to choose to play for the original outcomes or the additional outcomes.

22. The gaming device of claim 16, wherein a total number of the selections exceeds a number of the outcomes per selection.

23. The gaming device of claim 16, wherein a total number of the outcomes per selection exceeds a total number of the selections.

24. The gaming device of claim 16, wherein at least two of the selections have differing numbers of associated outcomes.

25. The gaming device of claim 16, wherein the probabilities are the same for at least two different selections.

26. The gaming device of claim 25, wherein the selections having the same probabilities have different payouts.

27. The gaming device of claim 16, wherein operation of the game is via a data network.

28. The gaming device of claim 27, wherein the data network is an Internet.

29. A gaming device comprising:

a plurality of different selections including at least three different selections;

a plurality of different outcomes associated with each selection;

a plurality of different outcome combinations, wherein each different outcome combination is formed from a plurality of said different selections;

a probability associated with each different outcome combination; and a payout associated with each outcome combination, wherein at least two of the payouts associated with at least two of the outcome combinations are different and wherein the payout multiplied by the probability forms an expected value for each outcome combination and wherein the expected values for each outcome combination add to substantially the same amount.

30. The gaming device of claim 29, wherein each outcome combination includes two outcomes.

31. The gaming device of claim 29, wherein each outcome combination includes three outcomes.

32. The gaming device of claim 29, which includes means for enabling a player to select individual selections that collectively form a desired selection combination selection.

33. The gaming device of claim 29, which includes means for enabling a player to select, at once, a desired outcome combination.

34. A gaming device comprising:

a processor;

a display device which communicates with the processor;

at least first, second and third player selectable selections displayed by the display device;

an event including a first place finish, a second place finish and a third place finish associated with each selection, said event displayed by the display device;

a probability associated with each selection and place finish, wherein the occurrence of each place finish is based on said probabilities, and wherein the occurrence of the first selection and first place finish has a higher probability than the occurrence of the second selection and first place finish and higher than the occurrence of the third selection and first place finish;

a payout associated with at least two of the place finishes, wherein a payout associated with the occurrence of the first selection and first place finish has a lower payout than the occurrence of the second selection and first place finish and lower than the occurrence of the third selection and first place finish; and an expected value for each selection which is based on the probability for each place finished multiplied by the associated payout and wherein a sum of the expected values associated with each selection are substantially the same amount.

35. The gaming device of claim 34, wherein the probabilities are configured such that a sum of all of the probabilities for the first selection at least approximately equals a sum of all of the probabilities for the second selection, which at least approximately equals a sum of all of the probabilities for the third selection.

36. The gaming device of claim 34, wherein the probabilities are configured such that a sum of all of the probabilities for the first place finish at least approximately equals a sum of all of the probabilities for the second place finish, which at least approximately equals a sum of all of the probabilities for third place finish.

37. The gaming device of claim 34, which includes a range of payouts for the first, second and third place finishes associated with the first selection that is smaller than a range of payouts for the first, second and third place finishes associated with the second selection.

38. The gaming device of claim 37, which includes a range of payouts for the first, second and third place finishes associated with the second selection that is different than a range of payouts for the first, second and third place finishes associated with the third selection.

39. The gaming device of claim 37, which includes a range of payouts for the first, second and third place finishes associated with the first selection that is different than a range of payouts for the first, second and third place finishes associated with the third selection.

40. The gaming device of claim 37, which includes for the third place finish, a higher payout and lower probability for the first selection than the second selction and third selection.

41. The gaming device of claim 37, which includes for the third place finish, a lower payout and higher probability for the third selection than the first selection and the second selection.

42. The gaming device of claim 41, which includes for the second place finish, a lower payout and higher probability for the second selection than the first selction and third selection.

43. A gaming device comprising:

a processor;

a display device controlled by the processor;

a first player selectable selection displayed by the display device;

a second player selectable selection displayed by the display device;

an event including a first place finish and a second place finish associated with each selection, said event displayed by the display device;

a probability associated with an occurrence of each selection and place finish, wherein the occurrence of each place finish for each selection is based on said probabilities and wherein the occurrence of the first selection and first place finish has a higher probability than the occurrence of the second selection and first place finish;

a payout associated with the occurrence of each selection and place finish, wherein the occurrence of the first selection and first place finish has a lower payout than the occurrence of the second selection and first place finish; and an expected value of each place finish for each selection which is based on the payout multiplied by the probability of each place finish for each selection, wherein a sum of the expected values for each selection are substantially the same amount.

44. A gaming device comprising:

a processor;

a display device controlled by the processor;

a first selection, a second selection and a third selection displayed by the display device;

an event including, for each selection, a first place finish, a second place finish and a third place finish displayed by the display device;

a probability associated with an occurrence of each place finish for each selection;

a payout associated with the occurrence of each place finish for each selection;

a range of payouts for the first, second and third place finishes associated with the first selection that is larger than a range of payouts for the first, second and third place finishes associated with the second and third selections; and an expected value of each place finish for each selection which is based on the payout multiplied by the probability of each place finish for said selection, wherein a sum of the expected values associated with each selection are substantially the same amount.

45. The gaming device of claim 44, which includes a range of payouts for the first, second and third place finishes associated with the second selection that is different than a range of payouts for the first, second and third place finishes associated with the third selection.

46. A gaming device comprising:

a processor;

a display device controlled by the processor;

a first selection, a second selection and a third selection displayed by the display device;

an event including, for each selection, a first outcome, a second outcome and a third outcome displayed by the display device;

a probability associated with an occurrence of each outcome for each selection;

a payout associated with the occurrence of each outcome for each selection;

a range of payouts for the first, second and third outcomes associated with the first selection that is larger than a range of payouts for the first, second and third place outcomes associated with the second and third selections; and an expected value for each selection which is based on a sum of the payout multiplied by the probability for each outcome for said selection, wherein the expected value associated with each selection is substantially the same amount.

47. The gaming device of claim 46, which includes a range of payouts for the first, second and third outcomes associated with the second selection that is different than a range of payouts associated with the first, second and third outcomes of the third selection.

48. A gaming device comprising:

a first selection having a first award and a second award;

a second selection having a first award and a second award;

a probability that the first selection achieves the first award of said first selection being higher than a probability that the second selection achieves the first award of said second selection, wherein the first award of said first selection is lower than the first award of said second selection;

a probability that the first selection achieves the second award of said first selection being lower than a probability that the second selection achieves the second award of said second selection, wherein said second award of said first selection is higher than said second award of said second selection, wherein the awards and probabilities are configured such that a total expected value for the first selection at least approximately equals a total expected value for the second selection; and a processor for:

(i) causing one of the selections to be selected, (ii) determining if the first award or the second award is achieved for said selected selection, wherein said determined award is based on the probabilities associated with said selected selection, and (iii) providing a player said achieved award.

49. A gaming device comprising:

a first selection having a first outcome and a second different outcome;

a second selection having a first outcome and a second different outcome;

a probability of achieving the first outcome of said first selection being higher than a probability of achieving the first outcome of said second selection;

a payout associated with the first outcome of said first selection being lower than a payout associated with the first outcome of said second selection;

a probability of achieving the second outcome of said first selection being lower than a probability of achieving the second outcome of said second selection;

a payout associated with the second outcome of said first selection being higher than a payout associated with the second outcome of said second selection;

a consolation award; and a processor for:

(i) causing one of the selections to be selected, (ii) determining one of the outcomes for said selected selection, wherein said outcome is determined based on the probabilities associated with said selected selection, and (iii) providing a player one of the payouts based on the outcome of the selected selection, wherein the consolation award is provided to the player when the player achieves a lowest possible payout.

50. A gaming device comprising:

a first selection having a first outcome and a second different outcome, wherein said first selection is provided in a bonus game;

a second selection having a first outcome and a second different outcome, wherein said second selection is provided in a bonus game;

a probability of achieving the first outcome of said first selection being higher than a probability of achieving the first outcome of said second selection;

a payout associated with the first outcome of said first selection being lower than a payout associated with the first outcome of said second selection;

a probability of achieving the second outcome of said first selection being lower than a probability of achieving the second outcome of said second selection;

a payout associated with the second outcome of said first selection being higher than a payout associated with the second outcome of said second selection; and a processor for:

(i) causing one of the selections to be selected in the bonus game, wherein which selection is selected is determined in a base game, (ii) determining one of the outcomes for said selected selection, wherein said outcome is determined based on the probabilities associated with said selected selection, and (iii) providing a player one of the payouts based on the outcome of the selected selection.

* * * * *

UNITED STATES PATENT AND TRADEMARK OFFICE

CERTIFICATE OF CORRECTION

PATENT NO. : 6,939,224 B2 
DATED : September 6, 2005
INVENTOR(S) : Gregg J. Palmer et al.

It is certified that error appears in the above-identified patent and that said Letters Patent is hereby corrected as shown below:

<u>Column 17,</u>
Line 60, change "values" to -- value --.

<u>Column 18,</u>
Line 33, change "associated with" to -- for --.

Signed and Sealed this

Third Day of January, 2006

JON W. DUDAS
*Director of the United States Patent and Trademark Office*